United States Patent [19]
Muroi et al.

[11] Patent Number: 5,633,074
[45] Date of Patent: May 27, 1997

[54] PREPREG AVAILABLE FOR FIBER REINFORCED THERMOPLASTIC RESIN AND PROCESS OF PRODUCING SPORTING GOODS USING THE SAME

[75] Inventors: Kunimasa Muroi; Toshiharu Fukushima; Kunio Hiyama, all of Shizuoka, Japan

[73] Assignee: Yamaha Corporation, Japan

[21] Appl. No.: 253,420

[22] Filed: Jun. 3, 1994

[30] Foreign Application Priority Data

| Jun. 7, 1993 | [JP] | Japan | 5-136277 |
| Jun. 25, 1993 | [JP] | Japan | 5-155879 |
| Jun. 25, 1993 | [JP] | Japan | 5-155880 |

[51] Int. Cl.$^6$ ............ B32B 1/08; B32B 17/04; B32B 27/02; B32B 27/04
[52] U.S. Cl. ............ 428/213; 428/35.7; 428/36.1; 428/215; 428/902; 428/408; 442/185
[58] Field of Search ............ 428/225, 257, 428/258, 259, 408, 902, 35.7, 36.1, 213, 215

[56] References Cited

U.S. PATENT DOCUMENTS

| 3,997,697 | 12/1976 | Brochier | 428/259 |
| 4,124,670 | 11/1978 | Cecka et al. | |
| 4,144,115 | 3/1979 | Sundberg | 156/161 |
| 4,445,951 | 5/1984 | Lind et al. | 156/93 |
| 4,479,999 | 10/1984 | Buckley et al. | |
| 5,175,034 | 12/1992 | De La Porte et al. | 428/762 |
| 5,238,728 | 8/1993 | Aucagne | 428/232 |
| 5,256,475 | 10/1993 | Koyanagi et al. | 428/225 |

FOREIGN PATENT DOCUMENTS

| 302989 | 2/1989 | European Pat. Off. . |
| 351201 | 7/1989 | European Pat. Off. . |
| 426158 | 5/1991 | European Pat. Off. . |
| 502796 | 9/1992 | European Pat. Off. . |
| 92 12847 | 8/1992 | WIPO . |
| 92 15740 | 9/1992 | WIPO . |

OTHER PUBLICATIONS

Database, WPI, Week 8839, Derwent Publications Ltd. London, GB; AN 8–276317(39); 'RD–A–292015, Aug. 10, 1988.

J.B. Sainsbury-Carter, *"Fabrication Techniques of Tubular Structures from Braided Preimpregnated Rovings"*, Society of Manufacturing Engineers, 1985.

*Primary Examiner*—Patrick J. Ryan
*Assistant Examiner*—Richard Weisberger
*Attorney, Agent, or Firm*—Ostrolenk, Faber, Gerb & Soffen, LLP

[57] ABSTRACT

A prepreg for a sleeve member of fiber reinforced thermoplastic resin available for a tennis racket or a golf club is woven by using ribbon-shaped reinforcing fiber tows/unidirectional commingle yarns and matrix fiber tows, and the ribbon-shaped reinforcing fiber tows/commingle yarns make the prepreg and, accordingly, the sleeve product thin, light, highly dense, economical and large in mechanical strength.

9 Claims, 13 Drawing Sheets

PREPREG AVAILABLE FOR FIBER REINFORCED THERMOPLASTIC RESIN AND PROCESS OF PRODUCING SPORTING GOODS USING THE SAME

FIELD OF THE INVENTION

This invention relates to a prepreg available for a fiber reinforced thermoplastic resin member and, more particularly, to a prepreg available for a tubular member of fiber reinforced thermoplastic resin such as, for example, a tennis racket and golf clubs.

DESCRIPTION OF THE RELATED ART

A product of fiber reinforced thermoplastic resin is fabricated through the following process. First, matrix fibers are made from a thermoplastic resin such as nylon or polycarbonate, and reinforcing fibers such as glass fibers or carbon fibers are mixed with the matrix fibers for producing a commingle yarn. The commingle yarns are woven into a cloth serving as a prepreg, and the reinforcing fibers of the warps cross the reinforcing fibers of the woofs in the prepreg.

A prepreg is shaped into a predetermined configuration. Heat and pressure are applied to the prepreg in a mold, and melts the matrix fibers in the commingle yarn. While the heat is being applied, the melted thermoplastic resin is impregnated in the reinforcing fibers, and forms a matrix of thermoplastic resin. A high-fiber content product may be produced from the prepreg.

The prepreg have found a wide variety of application, and a tennis racket and golf clubs are typical examples of the product made from the prepreg.

If the product has a tubular configuration such as a racket frame and a club shaft, the matrix fibers and the reinforcing fibers are spun into commingle yarns, and the commingle yarns are braided into a sleeve member. The sleeve member is placed in a heated mold, and internal pressure is applied for forming a tubular member of fiber-reinforced thermoplastic resin.

However, if economical large tex carbon fiber such as 12K tow is used for the commingle yarn, the sleeve member or the prepreg becomes very thick and heavy, because the economical large tex carbon fiber is fat and round in cross section. The fat fibers deteriorates the surface smoothness of the tubular member.

In order to decrease the weight, the prepreg may be braided with sparse tows. The prior art tubular thus product made from the sparse prepreg is liable to have a matrix partially without reinforcing fibers, and undesirable void tends to take place. As a result, the tubular product suffers from insufficient mechanical strength.

On the other hand, if carbon fiber tows with a small rex number such as the carbon fiber tows "3K" are used for the commingle yarn, the sleeve member is thin and light. However, the carbon fiber tows with the small tex number are so expensive that the manufacturer suffers from high production cost.

SUMMARY OF THE INVENTION

It is therefore an important object of the present invention to provide a prepreg available for a fiber reinforced thermoplastic resin member which is free from the drawbacks inherent in the prior art.

To accomplish the object, the present invention proposes to shape reinforcing fiber tows into a ribbon or to weave or braid commingle yarns without crossing each other.

In accordance with one aspect of the present invention, there is provided a prepreg for a product of fiber reinforced thermoplastic resin, comprising: a plurality of first thread means fusible under application of heat for forming a matrix of the fiber reinforced thermoplastic resin; and a plurality of second thread means providing reinforcing fibers of the fiber reinforced thermoplastic resin, the plurality of first thread means and the plurality of second thread means being woven into the prepreg, each of the plurality of second thread means is selected from the group consisting of a ribbon-shaped reinforcing fiber tow, a commingle yarn of reinforcing fibers mixed with matrix fibers forming a part of the matrix and a ribbon-shaped commingle yarn of reinforcing fibers mixed with matrix fibers forming a part of the matrix, the commingle yarn extending substantially in parallel to adjacent second thread means respectively implemented by the commingle yarns, the ribbon-shaped commingle yarns extending substantially in parallel to adjacent second thread means respectively implemented by the ribbon-shaped commingle yarns.

In accordance with another aspect of the present invention, there is provided a process process of producing a sporting good having a shaft member of fiber reinforced thermoplastic resin, comprising the steps of: a) preparing a sleeve-shaped prepreg having a plurality of first thread means fusible under application of heat for forming a matrix of the fiber reinforced thermoplastic resin, and a plurality of second thread means providing reinforcing fibers of the fiber reinforced thermoplastic resin, the plurality of second thread means being woven into the prepreg, each of the plurality of second thread means is selected from the group consisting of a ribbon-shaped reinforcing fiber tow, a commingle yarn of reinforcing fibers mixed with matrix fibers forming a part of the matrix and a ribbon-shaped commingle yarn of reinforcing fibers mixed with matrix fibers forming a part of the matrix, the commingle yarn extending substantially in parallel to adjacent second thread means respectively implemented by the commingle yarns, the ribbon-shaped commingle yarns extending substantially in parallel to adjacent second thread means respectively implemented by the ribbon-shaped commingle yarns; b) heating the sleeve-shaped prepreg over the melting point of the plurality of first thread means for producing the fiber reinforced thermoplastic resin; and c) completing the sporting good.

BRIEF DESCRIPTION OF THE DRAWINGS

The features and advantages of the prepreg available for a sleeve member used in a sporting good according to the present invention will be more clearly understood from the following description taken in conjunction with the accompanying drawings in which:

FIG. 12 is a perspective view showing a laminated sleeve member used in an experiment for determining the maximum volume per cent of auxiliary reinforcing fibers;

FIG. 13 is a graph showing relation between the ratio of a bending strength and a mixing ratio;

DESCRIPTION OF THE PREFERRED EMBODIMENTS

First Embodiment

Figure 1:
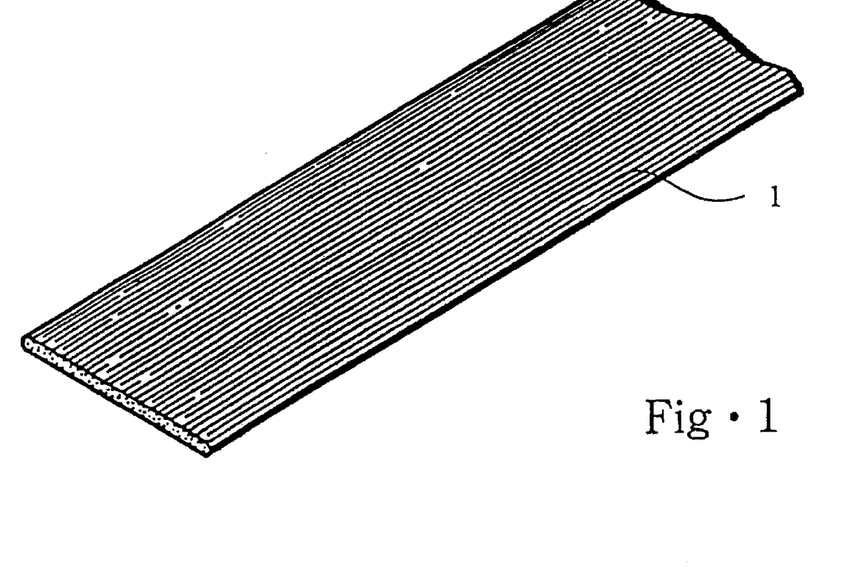
FIG. 1 is a perspective view showing a flat commingle yarn available for a woven prepreg according to the present invention.

Referring first to FIG. 1 of the drawings, a ribbon-shaped reinforcing fiber tow 1 is illustrated, and is available for a prepreg embodying the present invention. The ribbon-shaped reinforcing fiber tow 1 is made from a standard reinforcing fiber tow such as a carbon fiber tow with a large tex number 12K.

The standard reinforcing fiber tow has a round cross section, and is pressed by using a roller. The ribbon-shaped reinforcing fiber tow thus pressed under the roller is less than 0.5 millimeter in thickness, and the width of the ribbon-shaped reinforcing fiber tow is ten times or more than ten times larger than the thickness. The ratio between the thickness and the width desirably ranges from ten and twenty. The reinforcing fibers are selected from carbon fibers, glass fibers and aramide fibers.

If the standard carbon fiber tow is selected, the carbon fiber tow is roved under the pressure of the roller, and is, thereafter, sized by using a low molecular weight nylon resin or epoxy resin.

A matrix fiber tow is also shaped in a ribbon by using a roller, and the ribbon-shaped matrix fiber tow 2 is formed of a thermoplastic resin such as, for example, nylon, polycarbonate, polyphenylene oxide or polyetherimide. The ribbon-shaped matrix fiber tow 2 is also less than 0.5 millimeter thick, and the width is at least ten times larger than the thickness.

Figure 2:
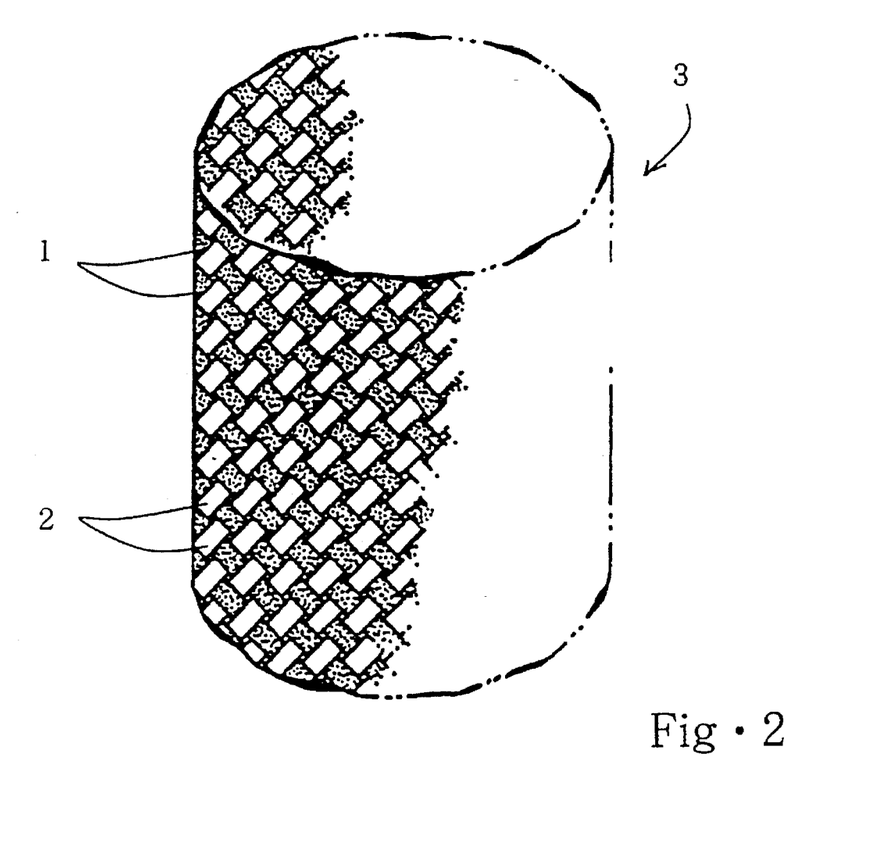
FIG. 2 is a perspective view showing a sleeve-shaped prepreg according to the present invention.

The ribbon-shaped reinforcing fiber tows 1 and the matrix fiber tows 2 are braided into a sleeve-shaped prepreg 3 shown in FIG. 2. In FIG. 2, the ribbon-shaped reinforcing fiber tows 1 are dotted for clear discrimination from the ribbon-shaped matrix fiber tows 2. The ribbon-shaped reinforcing fiber tows 1 are oriented to a predetermined direction, and, accordingly, the uni-directional ribbon-shaped reinforcing fiber tows 1 feature the braided prepreg 3.

If the ribbon-shaped reinforcing fiber tows 1 and the matrix fiber tows 2 are woven into a cloth, the woven cloth is wound on a mandrel, and is shaped into a sleeve configuration by bonding both end portions of the woven cloth. The ratio between the ribbon-shaped reinforcing fiber tows 1 and the ribbon-shaped matrix fiber tows 2 is dependent on the fiber content Vf to be requested, and the tex numbers of the tows 1 and 2 are also dependent on the fiber content Vf.

Figure 3:
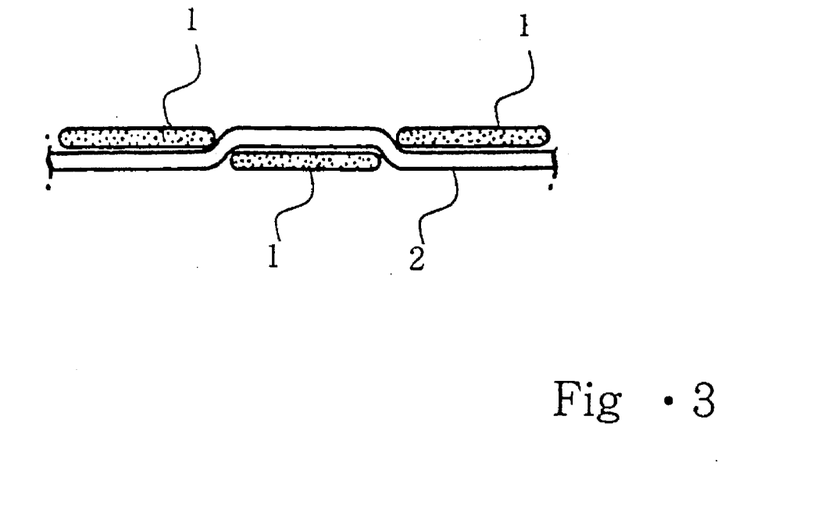
FIG. 3 is a cross sectional view showing a part of the prepreg according to the present invention.

Each of the ribbon-shaped reinforcing fiber tows occupies a wide area of the braided/woven cloth prepreg 3, and each ribbon-shaped matrix fiber tow 2 crosses over the ribbon-shaped reinforcing fiber tows 1 without a gap as shown in FIG. 3. For this reason, the reinforcing fiber tows with a large rex number are available, and the economical reinforcing fiber tow with a large rex number decreases the production cost. Finally, the ribbon-shaped reinforcing fiber tows and the ribbon-shaped matrix fiber tows do not widely wave in the braided/woven cloth prepreg 3, and, for this reason, the braided/woven cloth prepreg 3 is large in bending strength and torsional strength.

Moreover, even if the standard reinforcing fiber tow is sparse, the roller presses the tow of the reinforcing fibers flat, and decreases gaps therebetween. As a result, the braided/woven cloth prepreg 3 is light and high density, and creates a smooth surface.

The braided/woven cloth prepreg shaped into the sleeve is placed in a mold, and is heated over the melting point of the thermoplastic resin. Internal pressure is applied to the braided/woven cloth prepreg 3, and the braided/woven cloth prepreg 3 is pressed against the inner surface of the mold. Then, the melted thermoplastic resin forms a matrix after cooling down in the mold, and a tubular member is taken out from the mold.

The ribbon-shaped reinforcing fiber tows and the ribbon-shaped matrix fiber tows thus crossed without gaps evacuate the air from the braided/woven cloth prepreg 3, and undesirable void hardly takes place in the sleeve product of the fiber reinforced thermoplastic resin.

In the first embodiment, both of the reinforcing fiber tows 1 and the matrix fiber tows are ribbon-shapes. However, a modification of the first embodiment may be woven by using the ribbon-shaped reinforcing fiber tows 1 and standard matrix fiber tows with a circular cross-section. The ribbon-shaped matrix fiber tows may be partially replaced with the standard matrix fiber tows. A matrix resin tape is available instead of the matrix fiber tows.

Moreover, in another modification of the first embodiment, parts of the matrix fiber tows may be replaced with the ribbon-shaped reinforcing fiber tows at 30 per cent or less.

Figure 4:
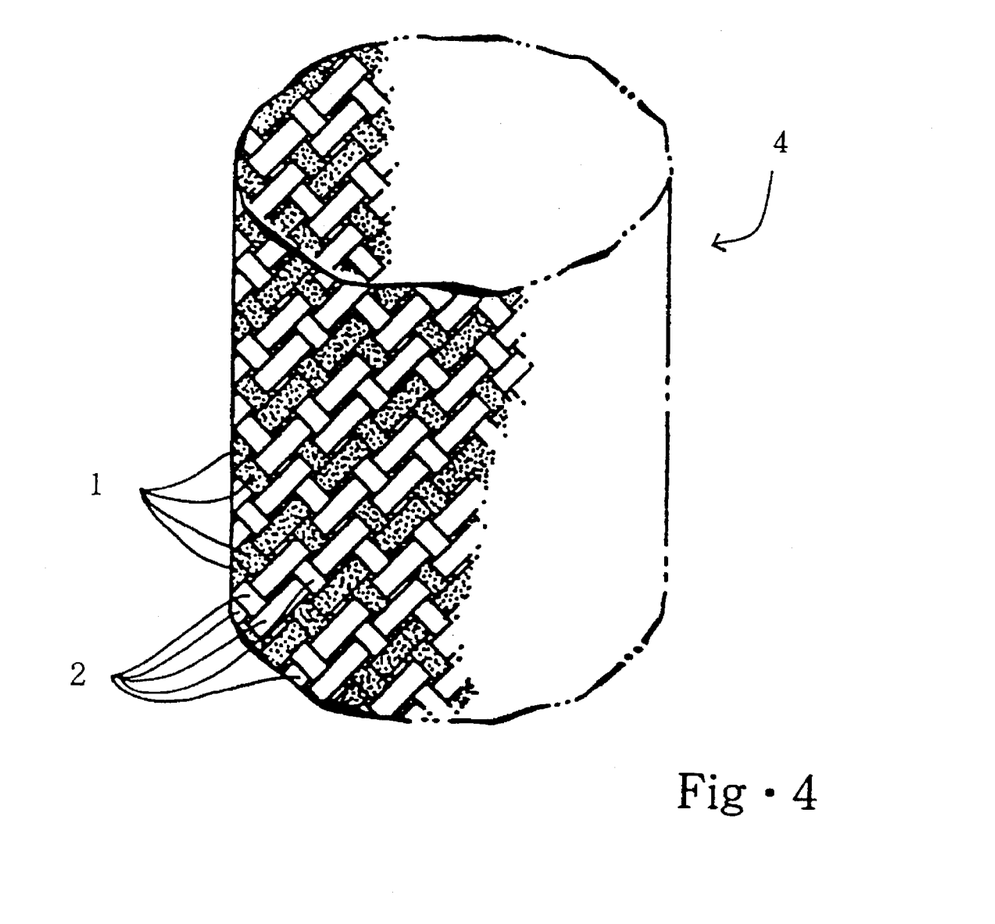
FIG. 4 is a perspective view showing a modification of the sleeve-shaped prepreg according to the present invention.

In yet another modification of the first embodiment, the ribbon-shaped reinforcing fiber tows 1 and the ribbon-shaped matrix fiber tows 2 are twilled into a prepreg 4 as shown in FIG. 4. The ribbon-shaped reinforcing fiber tows 1 are also dotted in FIG. 4. The ribbon-shaped reinforcing fiber tows 1 are crossed each other at 90 degrees in the twilled prepreg 4, and the twilled prepreg 4 is formed into a sleeve configuration. Although the ribbon-shaped reinforcing fiber tows 1 are crossed each other, the ribbon-shaped reinforcing fiber tows do not widely wave, and are large in the bending strength and in the torsional strength.

As will be understood from the foregoing description, the ribbon-shaped reinforcing fiber tows according to the present invention make the prepreg thin, light, high dense, economical and large in mechanical strength, and a sleeve member made therefrom is free from undesirable void, undesirable portions of a matrix without reinforcing fibers and rough surface.

Second Embodiment

Figure 5:
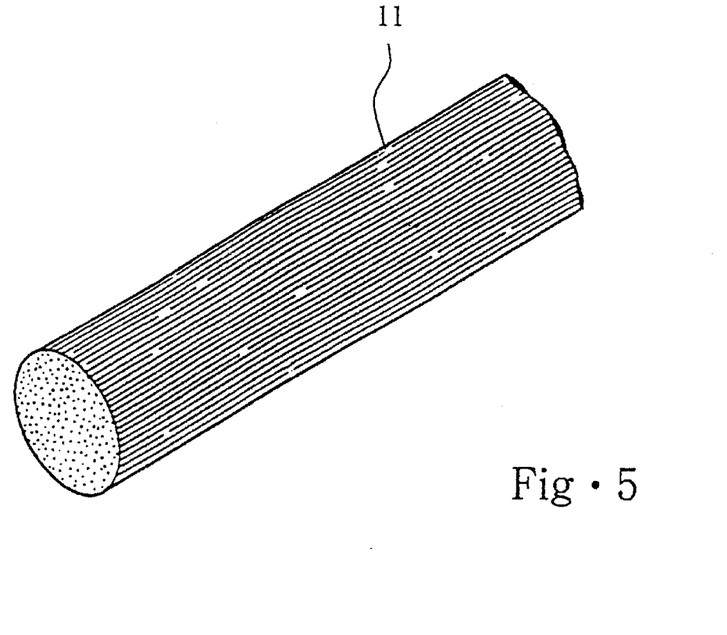
FIG. 5 is a perspective view showing a commingle yarn used for another prepreg according to the present invention.

Turning to FIG. 5 of the drawings, a commingle yarn 11 available for a prepreg embodying the present invention is illustrated, and reinforcing fibers are mixed in the commingle yarn together with matrix fibers. The reinforcing fibers are carbon fibers, glass fibers or aramide fibers, and the matrix fibers are formed of a thermoplastic resin such as, for example, nylon, polycarbonate or polyphenylene oxide.

The rex number of the reinforcing fibers and the rex number of the matrix fibers are dependent on the fiber content Vf to be requested. However, it is desirable for the commingle yarn to contain the reinforcing fibers at least 30 per cent by volume. If the reinforcing fibers are less than 30 per cent by volume, a product made therefrom is insufficient in mechanical strength.

Figure 6:
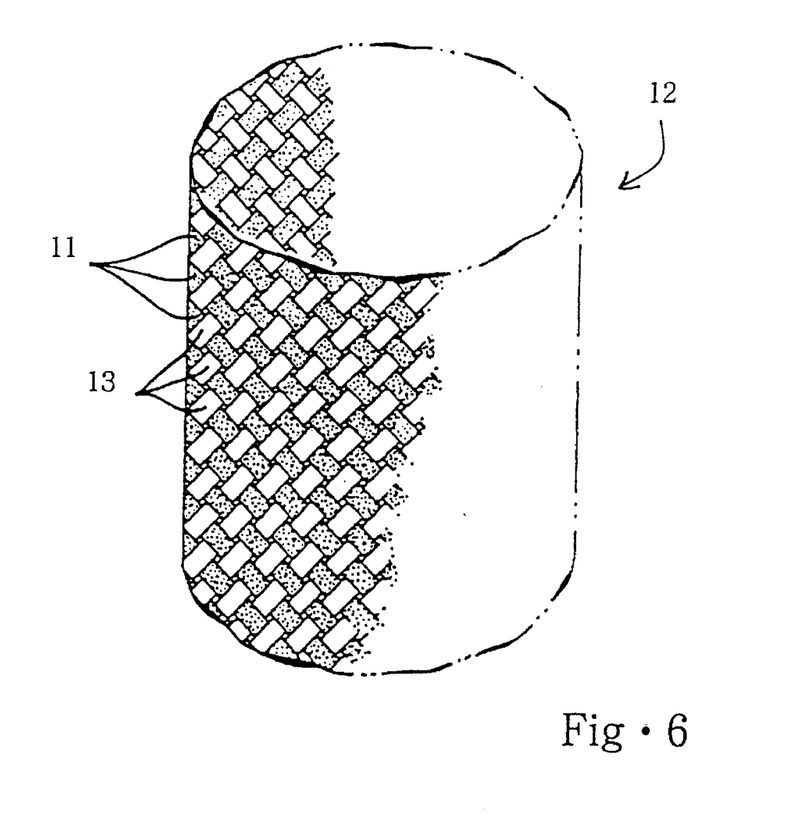
FIG. 6 is a perspective view showing another prepreg woven by using the commingle yarns shown in FIG. 5.

A sleeve shaped prepreg 12 is braided by using the commingle yarns 11 and matrix fiber tows 13, and the commingle yarns 11 are dotted for clear discrimination from the matrix fiber tows 13. The commingle yarns 11 and the matrix fiber tows 13 may be woven into a cloth, and is shaped into a sleeve configuration by using a mandrel and an adhesion paste. The commingle yarn 11 serves as either warp or woof of the braided/woven cloth prepreg 12, and does not cross the other commingle yarns 11. Although the commingle yarns 11 extend in spiral, each commingle yarn 11 extends in parallel to the adjacent commingle yarns 11 over the outer surface of the sleeve-shaped prepreg 12, and term "uni-directional" describes such parallel commingle yarns 11 in this specification.

The braided/woven cloth prepreg 12 is placed in a mold, and is, then, heated over the melting point of the thermoplastic resin. Internal pressure is applied to the braided/woven cloth prepreg 12, and the braided/woven cloth prepreg 12 is pressed against the inner surface of the mold. The matrix fibers are melted, and form a matrix of the fiber reinforced thermoplastic resin. After cooling down in the mold, a tubular member of the fiber reinforced thermoplastic resin is taken out from the mold.

Since the commingle yarns 11 are uni-directional, the reinforcing fibers do not cross each other, and a void and a bank hardly take place. This results in large mechanical strength, and the surface of the sleeve member is extremely smooth.

Figure 7:
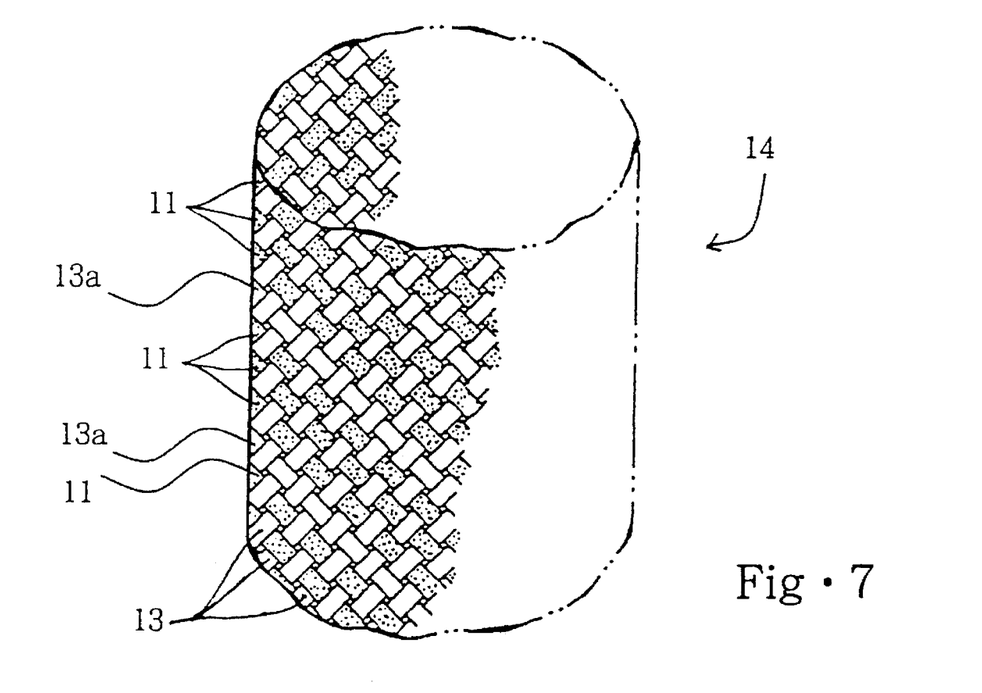
FIG. 7 is a perspective view showing a modification of the prepreg shown in FIG. 6.

The prepreg implementing the second embodiment can be modified as follows. In a modification 14, the commingle yarns 11 are partially replaced with auxiliary matrix fiber tows 13a similar to the matrix fiber tows 13 as shown in FIG. 7.

Figure 8:
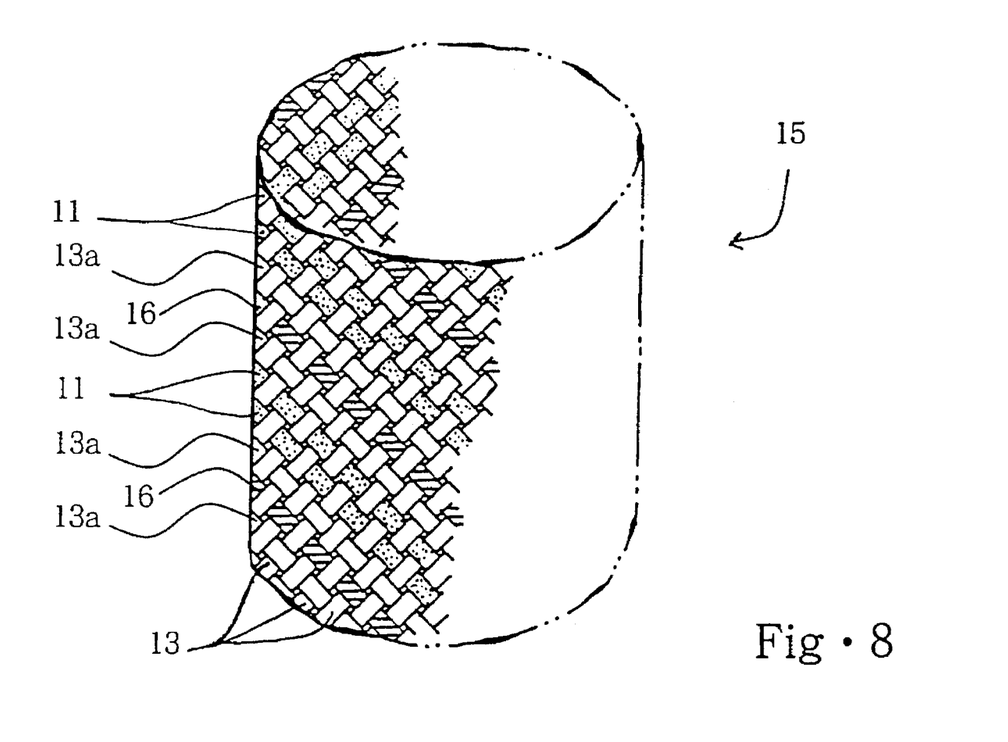
FIG. 8 is a perspective view showing another modification of the prepreg shown in FIG. 6.

Another modification 15 is woven by using not only the commingle yarns 11 and the matrix fiber tows 13 but also the auxiliary matrix fiber tows 13a and auxiliary reinforcing fiber tows 16 as shown in FIG. 8. The auxiliary reinforcing fiber tows 16 are the standard reinforcing fiber tows, and are hatched for clear discrimination. In yet another modification, the commingle yarns 11 are partially replaced with the auxiliary reinforcing fiber tows 16.

Figure 9:
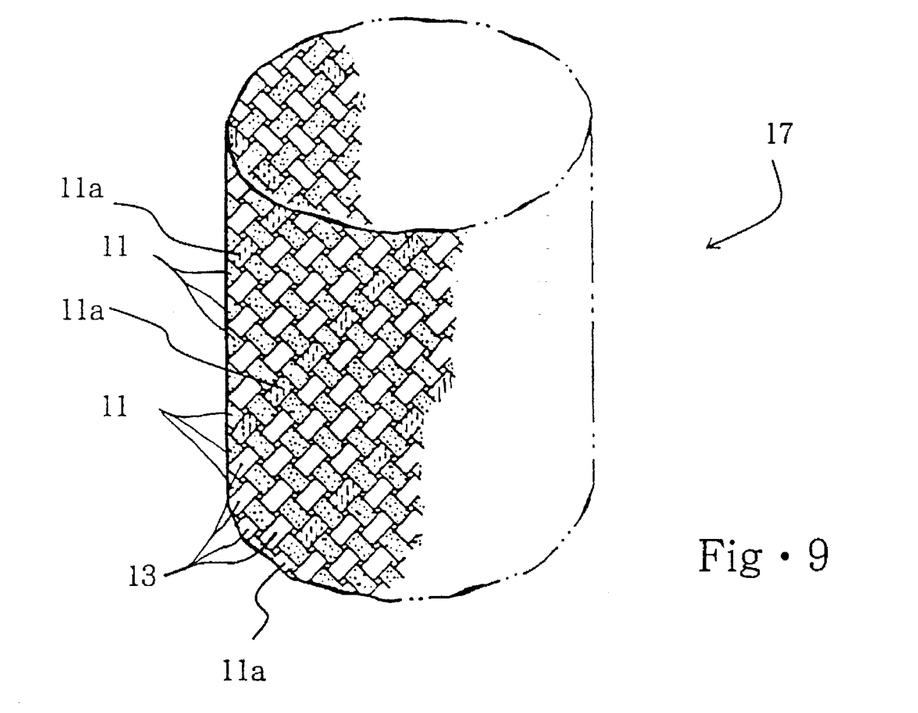
FIG. 9 is a perspective view showing yet another modification of the prepreg shown in FIG. 6.
Figure 10:
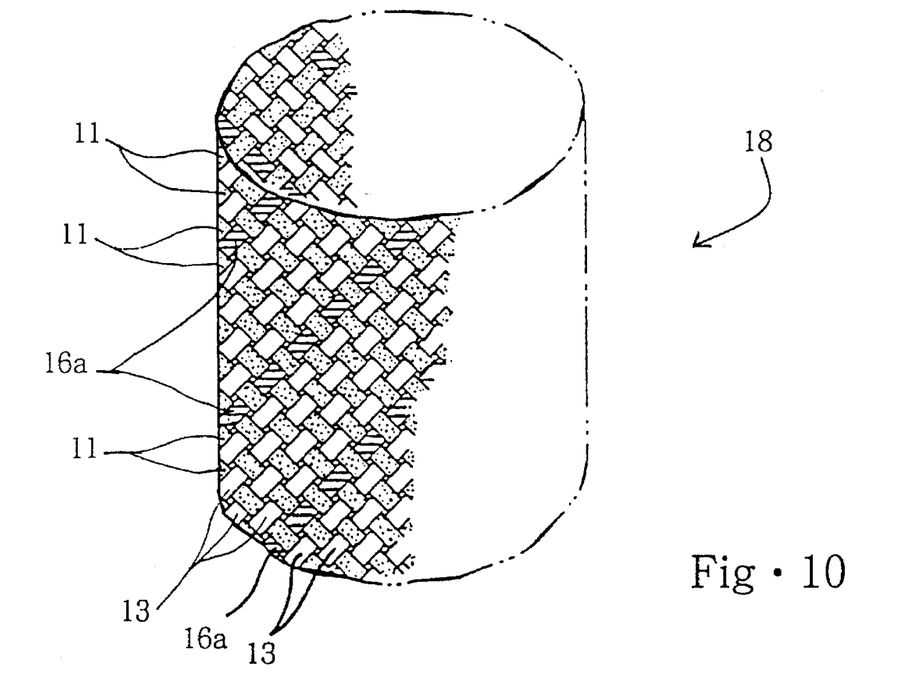
FIG. 10 is a perspective view showing still another modification of the prepreg shown in FIG. 6.

The prepreg implementing the second embodiment is further modified as follows. A modification 17 contains auxiliary commingle yarns 11a instead of parts of the matrix fiber tows 13 as shown in FIG. 9, and the auxiliary commingle yarns 11a are hatched by using broken lines for clear discrimination. In another modification 18, the matrix fiber tows 13 are partially replaced with auxiliary reinforcing fiber tows 16a as shown in FIG. 10, and the matrix fiber tows 13 are partially replaced with the auxiliary commingle yarns 11a and the auxiliary reinforcing fiber tows 16a in yet another modification 19 shown in FIG. 11.

Figure 11:
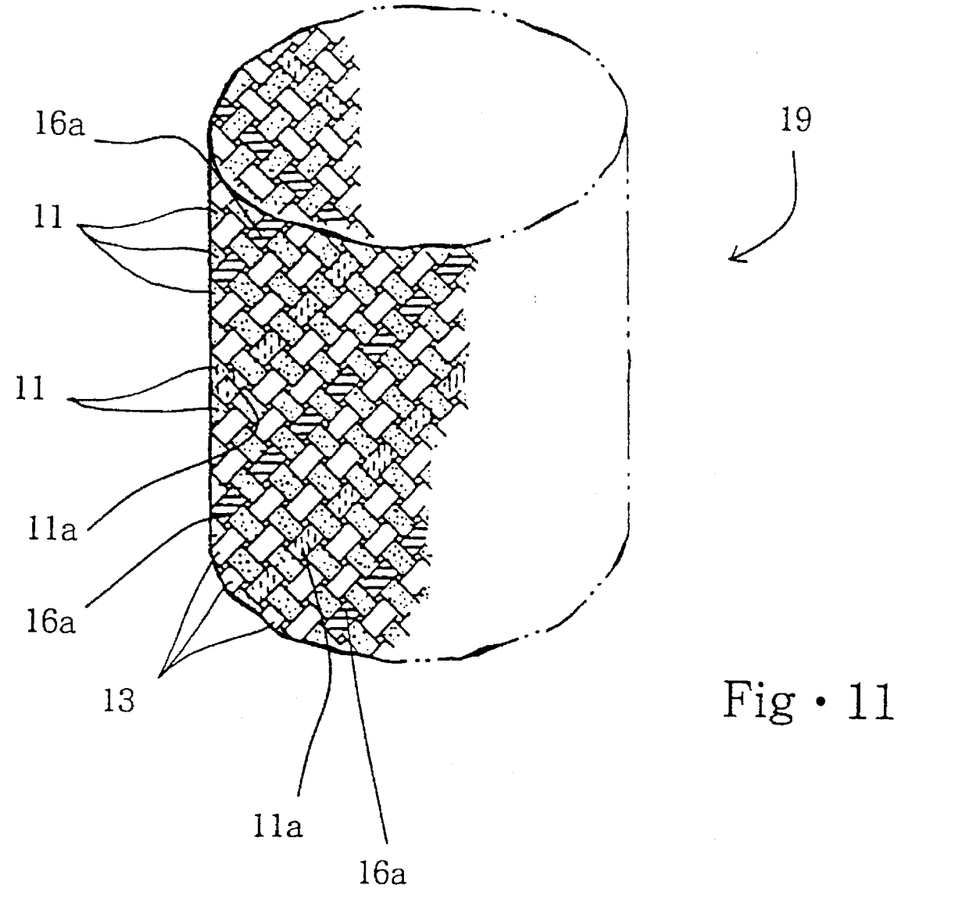
FIG. 11 is a perspective view showing yet another modification of the prepreg shown in FIG. 6.

The auxiliary reinforcing fiber tows 16a crossing the commingle yarns 11 are equal to or less than 30 per cent by volume with respect to the reinforcing fibers forming parts of the commingle yarns 11. This is because of the fact that the auxiliary reinforcing fiber tows 16a over 30 per cent by volume lower the mechanical strength of the sleeve member of fiber reinforced thermoplastic resin.

The auxiliary reinforcing fibers prevents the uni-directional commingle yarns 11 from lose of alignment while the matrix fibers are forming the matrix. The auxiliary reinforcing fibers not greater than 30 per cent by volume are effective against a void and a bank, and enhance the mechanical strength of the sleeve member. The surface of the sleeve member is smooth, because most of the fibers extend without crossing other fibers.

The ratio of commingle yarns to the matrix fiber tows and/or the reinforcing fiber tows is dependent on the fiber content Vf, and the tex numbers thereof are also determined by using the fiber content Vf.

The present inventors determined the preferable range of the auxiliary reinforcing fibers through the following experiment. First, two kinds of sleeve were prepared. The sleeves classified in the first group were made from reinforcing fibers T300 and matrix fibers of nylon resin, and were 50 per cent in the fiber content Vf and 45 degrees in oriented angle. The reinforcing fibers oriented to 45 degrees served as main reinforcing fibers, and the auxiliary reinforcing fibers were mixed into the sleeves at different percentage with respect to the main reinforcing fibers. The auxiliary reinforcing fibers crossed the main reinforcing fibers at right angle.

The sleeves classified in the second group were made from the reinforcing fibers T300 and the matrix fibers of nylon resin, and were also 50 per cent in fiber content and −45 degrees in oriented angle. T300 is a product name of the reinforcing fibers made by Toray Corporation. The reinforcing fibers oriented to −45 degrees served as the main reinforcing fibers, and the auxiliary reinforcing fibers were mixed into the sleeves at different percentage with respect to the main reinforcing fibers. The auxiliary reinforcing fibers also crossed the main reinforcing fibers at right angle.

The sleeves classified in the first group and the sleeve classified in the second group were alternately laminated for a forming four-layer laminated sleeve member, and the four-layer laminated sleeve member was 10 millimeters in diameter, 1 millimeter in thickness and 100 millimeters in length. The lamination was desirable for the isotropy of the resultant sleeve member. The four-layer laminated sleeve members 21 thus prepared were different in the content of auxiliary reinforcing fibers by changing the component sleeves.

Each of the four-layer laminated sleeve members 21 was placed on brackets 22a and 22b spaced by 50 millimeters as shown in FIG. 12, and a pressure member 23 pressed the intermediate point of the four-layer laminated sleeve member 21. The pressure member 23 was downwardly moved by 5 millimeters per minutes, and measured the maximum load when the pressure member 23 broke the four-layer laminated sleeve member 21.

FIG. 13 shows the ratio between the bending strength exerted on the laminated sleeve member with a mixing ratio at zero and a bending strength exerted on a laminated sleeve member with a given mixing ratio. The mixing ratio is defined as a ratio between the main reinforcing fibers and the auxiliary reinforcing fibers. If the sleeves implemented by only the main reinforcing fibers oriented to 45 degrees are alternately laminated on the sleeves implemented by only the main reinforcing fibers oriented to −45 degrees, the mixing ratio is zero. On the other hand, if the main reinforcing fibers are equal in volume to the auxiliary reinforcing fibers, the mixing ratio is 100 per cent.

The plots in FIG. 13 were drastically changed at 30 per cent by volume, and the present inventors recommended that the auxiliary reinforcing fibers were maximized at 30 per cent by volume.

As will be understood from the foregoing description, the uni-directional commingle yarns are effective against a void and a bank, and enhance the mechanical strength of the sleeve member. Moreover, the uni-directional commingle yarns improve the surface smoothness of the sleeve member.

Third Embodiment

Figure 14:
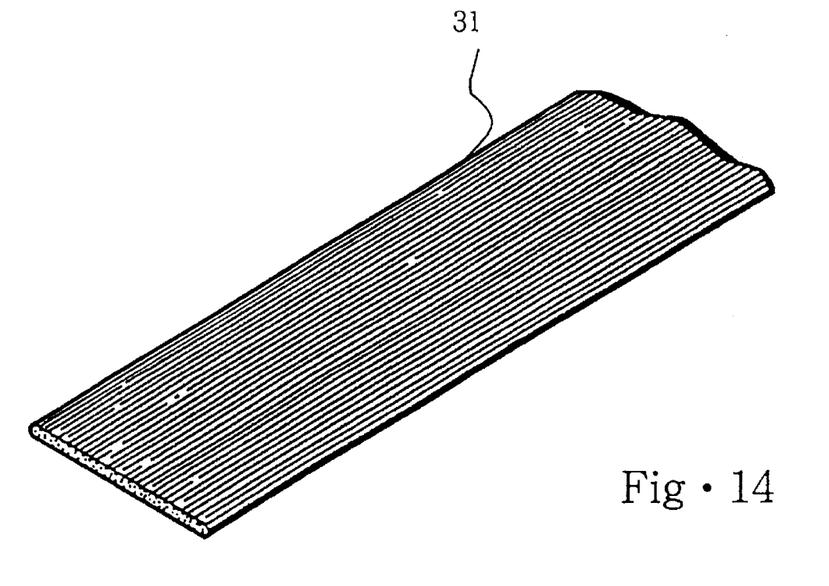
FIG. 14 is a perspective view showing a ribbon-shaped commingle yarn used for yet another prepreg according to the present invention.

Turning to FIG. 14 of the drawings, a ribbon-shaped commingle yarn 31 is illustrated, and is available for a prepreg embodying the present invention. The ribbon-shaped commingle yarn 31 is made from the commingle yarn used for the prepreg implementing the second embodiment by pressing it flat.

In detail, reinforcing fibers are mixed in the commingle yarn together with matrix fibers. In this instance, the reinforcing fibers are carbon fibers, glass fibers or aramide fibers.

The tex number of the reinforcing fibers and the tex number of the matrix fibers are dependent on the fiber content Vf to be requested. However, it is desirable for the commingle yarn to contain the reinforcing fibers at least 30 per cent by volume. If the reinforcing fibers are less than 30 per cent by volume, a product made therefrom is insufficient in mechanical strength.

The commingle yarn is pressed by using a roller. The ribbon-shaped commingle yarn thus pressed under the roller becomes thin, and the width of the ribbon-shaped commingle yarn is at least four times larger than the thickness. The ratio of the width to the thickness desirably ranges from 4 to 20.

The commingle yarn is roved under the pressure of the roller and heat application, and the commingle yarn thus treated is shaped into the ribbon. A sizing agent may be used after the shaping. Alternatively, while the commingle yarn is being roved under the pressure and the heat, an operator temporally loosens the roving in the longitudinal direction, and blows water or air for making it flat. Thereafter, the commingle yarn is heated under the pressure of a roller, and is shaped into a ribbon.

Figure 15:
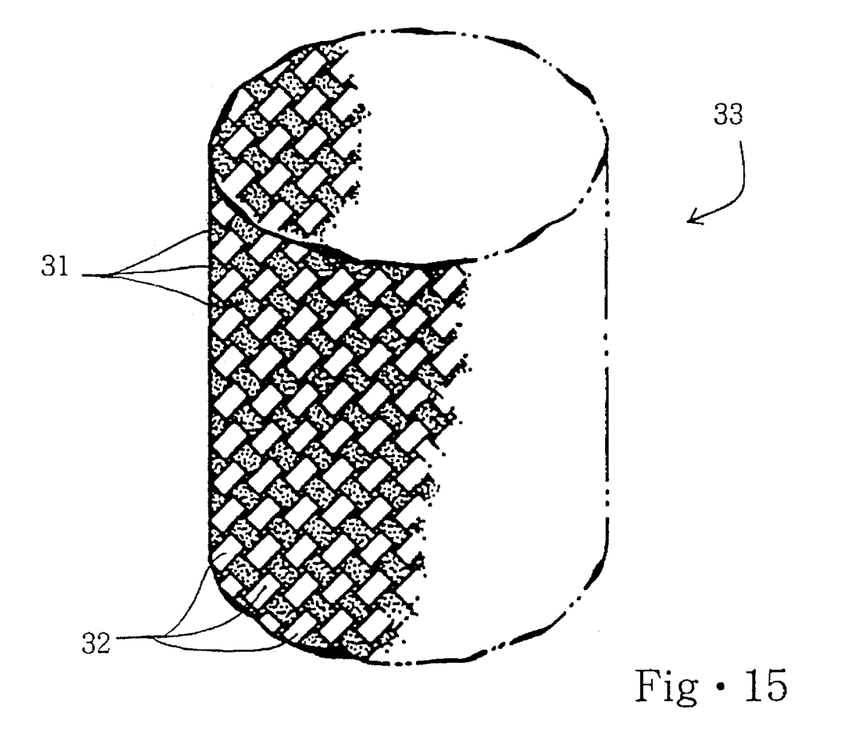
FIG. 15 is a perspective view showing the prepreg according to the present invention.

Turning to FIG. 15 of the drawings, the ribbon-shaped commingle yarns 31 and ribbon-shaped matrix fibers 32 are braided into a sleeve-shaped prepreg 33, and the ribbon-shaped matrix fiber tows 32 have a width also at least four times larger than the thickness thereof. The matrix fiber tows 32 are formed of a thermoplastic resin such as, for example, nylon, polycarbonate or polyphenylene oxide. The matrix fiber tows may be replaced with matrix ribbons of the above described resin.

The ribbon-shaped commingle yarns 31 and the ribbon-shaped matrix fibers 32 may be woven into a cloth. The woven cloth is wound on a mandrel, and an end portion of the woven cloth thus wound on the mandrel may be bonded to the other end portion of the woven cloth for shaping the woven cloth into the sleeve-shaped prepreg 33. In FIG. 15, the commingle yarns 31 are dotted for clearly discriminating them from the matrix fiber tows 32.

The ribbon-shaped commingle yarns 31 are uni-directional, and each commingle yarn 31 does not cross the other ribbon-shaped commingle yarns 31.

Figure 16:
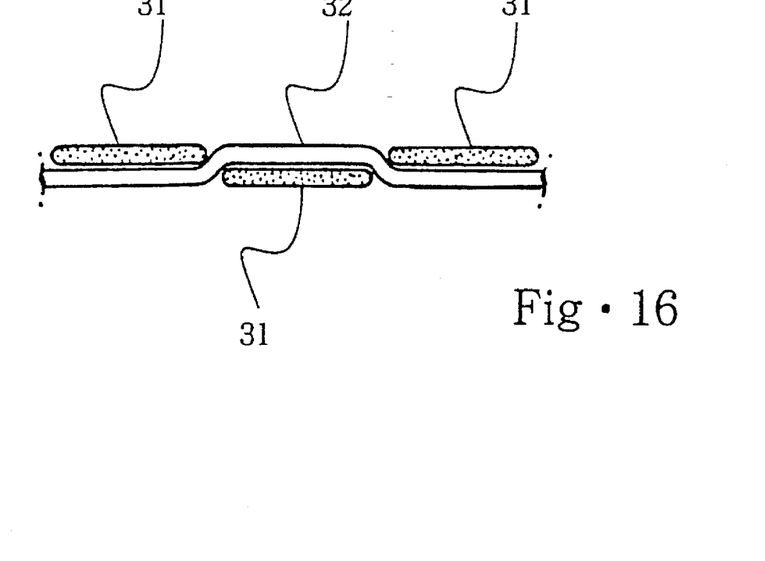
FIG. 16 is a cross sectional view showing a ribbon-shaped matrix fiber tow crossing ribbon-shaped commingle yarns.

Each of the ribbon-shaped commingle yarns 31 occupies a wide area of the sleeve-shaped prepreg 33, and each ribbon-shaped matrix fiber tow 32 crosses over the ribbon-shaped commingle yarns 31 without a gap as shown in FIG. 16. For this reason, commingle yarns with a large tex number are available, and the economical commingle yarns with a large rex number decreases the production cost. The ribbon-shaped commingle yarns 31 and the ribbon-shaped matrix fiber tows 32 do not widely wave in the braided/woven cloth prepreg, and, for this reason, the braided/woven cloth prepreg is large in bending strength and torsional strength.

Moreover, the roller presses the commingle yarns flat, and decreases gaps therebetween. As a result, the braided/woven cloth prepreg 33 is light and high density.

The braided/woven cloth prepreg 33 is placed in a mold, and is heated over the melting point of the thermoplastic resin. Internal pressure is applied to the braided/woven cloth prepreg 33, and the braided/woven cloth prepreg 33 is pressed against the inner surface of the mold. The melted thermoplastic resin forms a matrix after cooling down in the mold, and a sleeve member is taken out from the mold.

The ribbon-shaped commingle yarns 31 do not cross each other, and are uni-directional. For this reason, a void and a bank hardly take place in the braided/woven cloth prepreg.

Figure 17:
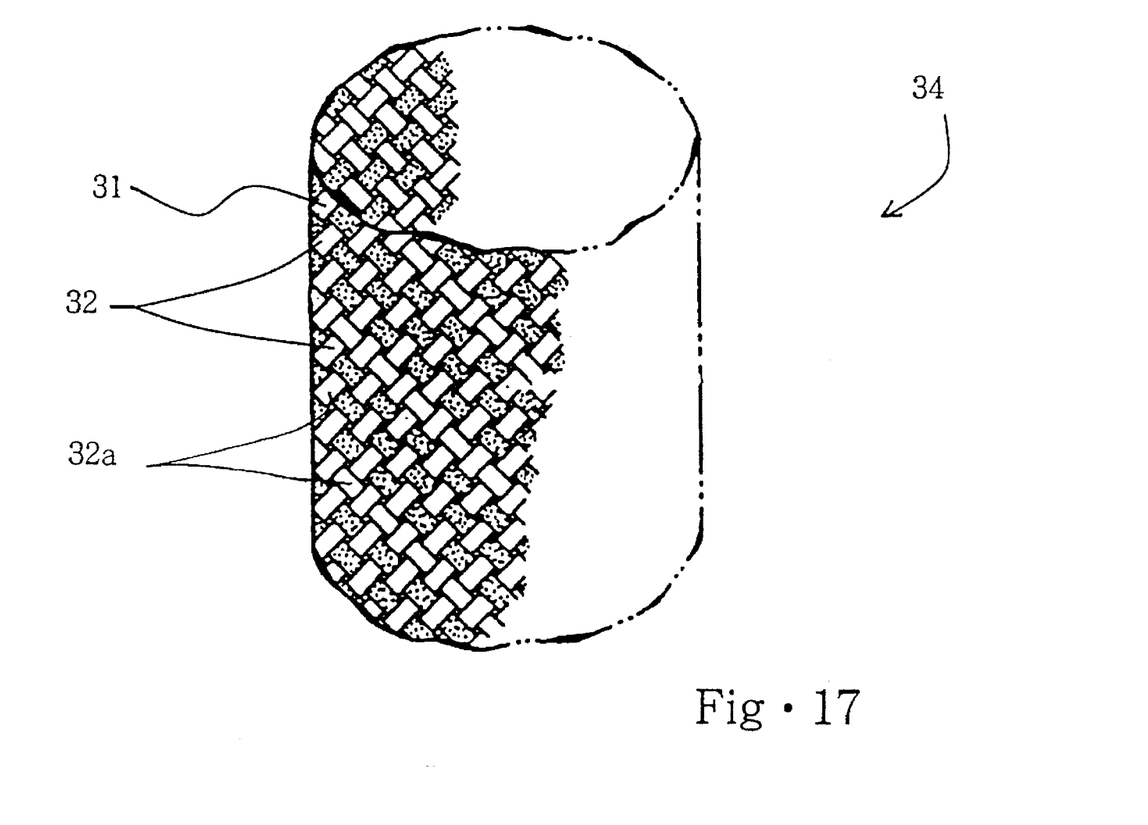
FIG. 17 is a perspective view showing a modification of the sleeve-shaped prepreg shown in FIG. 15.

The prepreg implementing the third embodiment is modified as follows. In a modification 14, the ribbon-shaped commingle yarns 31 are partially replaced with ribbon-shaped auxiliary matrix fiber tows 32a similar to the ribbon-shaped matrix fiber tows 32 as shown in FIG. 17. The ribbon-shaped auxiliary matrix fiber tows 32a has a width at least four times larger than the thickness thereof.

Figure 18:
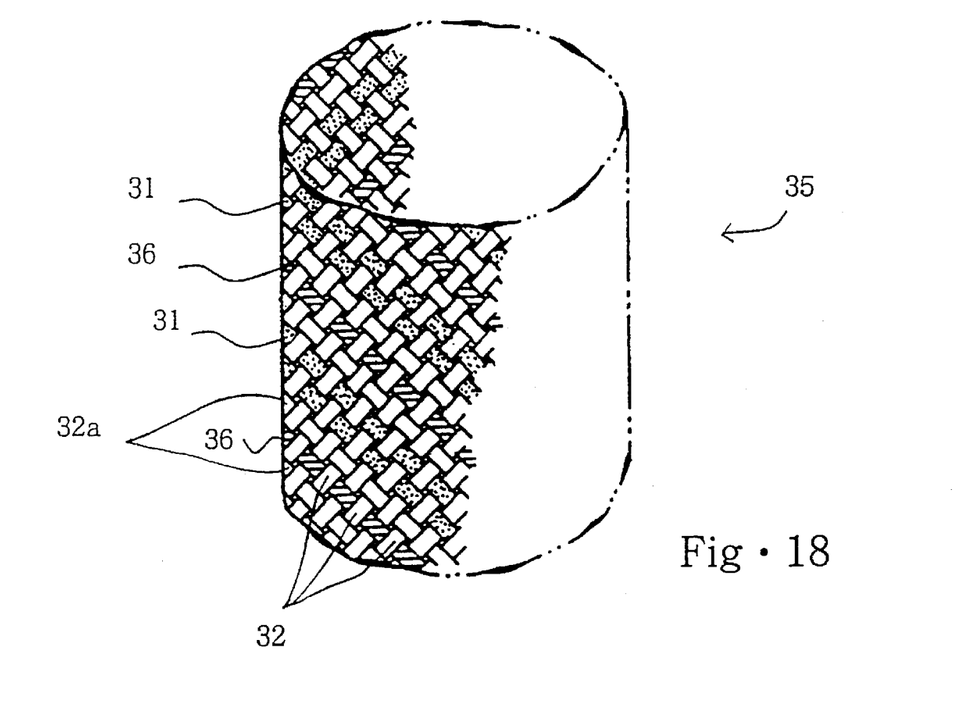
FIG. 18 is a perspective view showing another modification of the sleeve-shaped prepreg shown in FIG. 15.

Another modification 15 is woven by using not only the ribbon-shaped commingle yarns 31 and the ribbon-shaped matrix fiber tows 32 but also the ribbon-shaped auxiliary matrix fiber tows 32a and ribbon-shaped auxiliary reinforcing fiber tows 36 as shown in FIG. 18. The reinforcing fibers of the ribbon-shaped auxiliary reinforcing fiber tows 16 are oriented to the same direction as the reinforcing fibers of the ribbon-shaped commingle yarns 31, and are hatched for clear discrimination. The ribbon-shaped auxiliary reinforcing fiber tows has a width at least four times larger than the thickness thereof.

In yet another modification, the ribbon-shaped commingle yarns 11 are partially replaced with the auxiliary reinforcing fiber tows 36.

Figure 19:
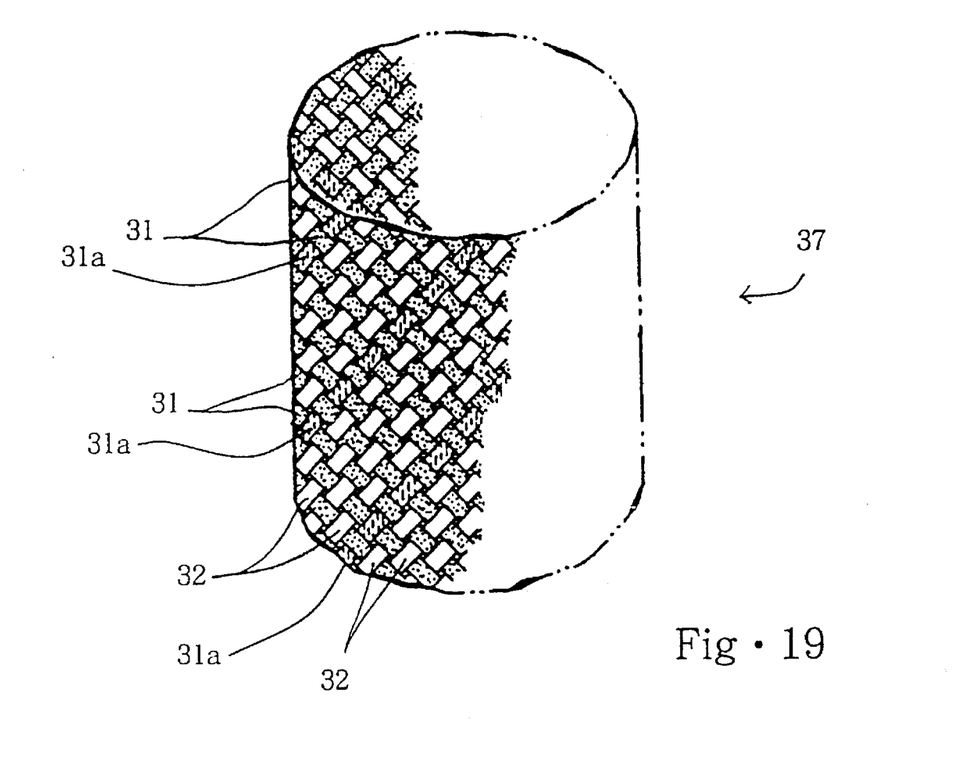
FIG. 19 is a perspective view showing yet another modification of the sleeve-shaped prepreg shown in FIG. 15.

The prepreg implementing the third embodiment is further modified as follows. A modification 37 contains auxiliary ribbon-shaped commingle yarns 31a instead of parts of the matrix fiber tows 32 as shown in FIG. 19, and the auxiliary commingle yarns 11a are hatched by using broken lines for clear discrimination. The auxiliary ribbon-shaped commingle yarns 31a are partially implemented by reinforcing fibers and matrix fibers as similar to the ribbon-shaped commingle yarns 31, and have a width at least four time larger than the thickness thereof. The reinforcing fibers of the auxiliary ribbon-shaped commingle yarns 31a are equal to or less than 30 per cent in volume of the reinforcing fibers of the ribbon-shaped commingle yarns 31 because of the mechanical strength as described hereinbefore in connection with the modifications of the second embodiment.

Figure 20:
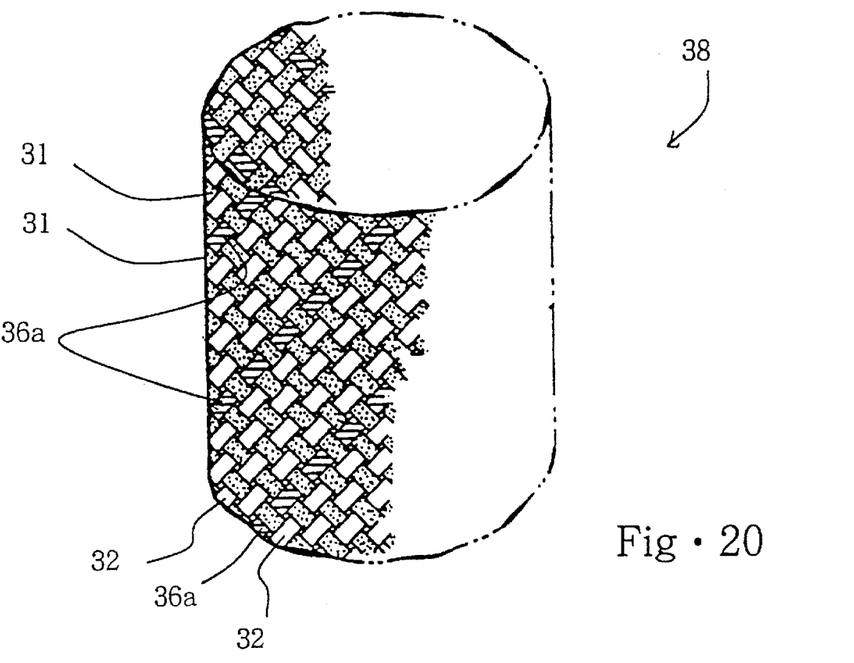
FIG. 20 is a perspective view showing still another modification of the sleeve-shaped prepreg shown in FIG. 15.

In another modification 38, the ribbon-shaped matrix fiber tows 32 are partially replaced with the auxiliary ribbon-shaped reinforcing fiber tows 36a as shown in FIG. 20, and the auxiliary ribbon-shaped reinforcing fiber tows 36a are equal to or less than 30 per cent of the reinforcing fibers of the ribbon-shaped commingle yarns 31 in volume because of the mechanical strength.

Figure 21:
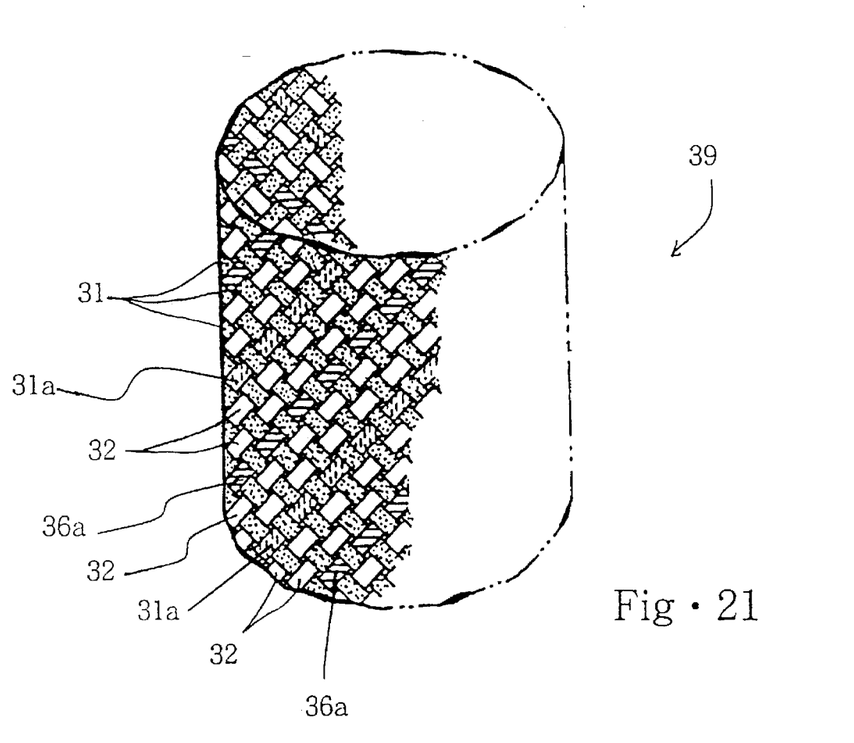
FIG. 21 is a perspective view showing a modification of the sleeve-shaped prepreg shown in FIG. 15.

The ribbon-shaped matrix fiber tows 32 are partially replaced with the auxiliary ribbon-shaped commingle yarns 31a and the auxiliary ribbon-shaped reinforcing fiber tows 36a in yet another modification 39 shown in FIG. 21. The total volume of the reinforcing fibers are also equal to or less than 30 per cent in volume of the reinforcing fibers of the ribbon-shaped commingle yarns 31 because of the mechanical strength.

If the ribbon-shaped matrix fiber tows 32 are partially replaced with the auxiliary ribbon-shaped commingle yarns 31a and/or the auxiliary ribbon-shaped reinforcing fiber tows 36a, the reinforcing fiber tows in the ribbon-shaped commingle yarns 31 are hardly disturbed in the molding stage.

The matrix fiber tows, the auxiliary matrix fiber tows, the auxiliary commingle yarns and the auxiliary reinforcing fiber tows may not be shaped into ribbon, but are circles in cross section.

Application to Sporting Goods

Figure 22:
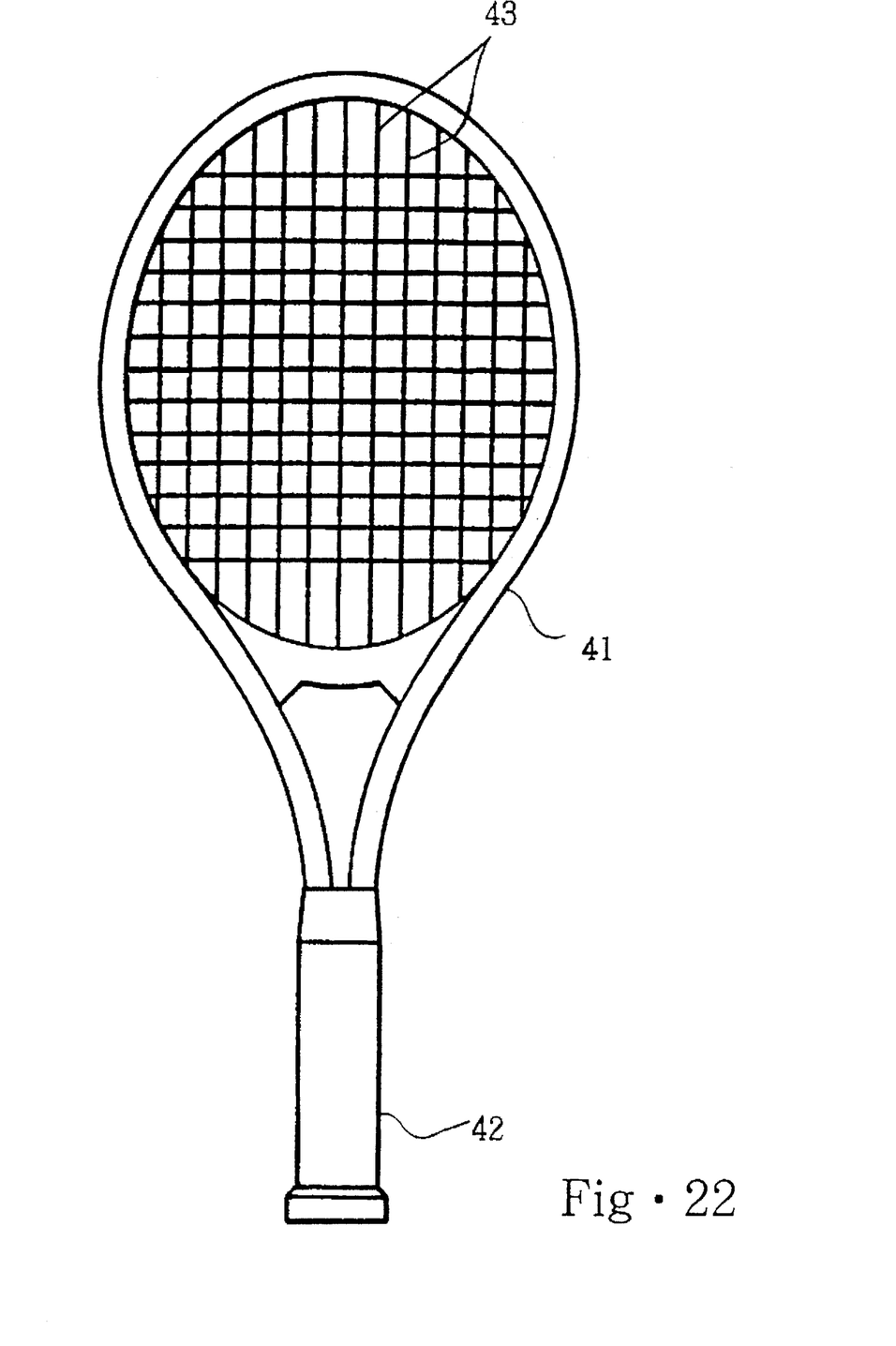
FIG. 22 is a front view showing a tennis racket according to the present invention.
Figure 23:
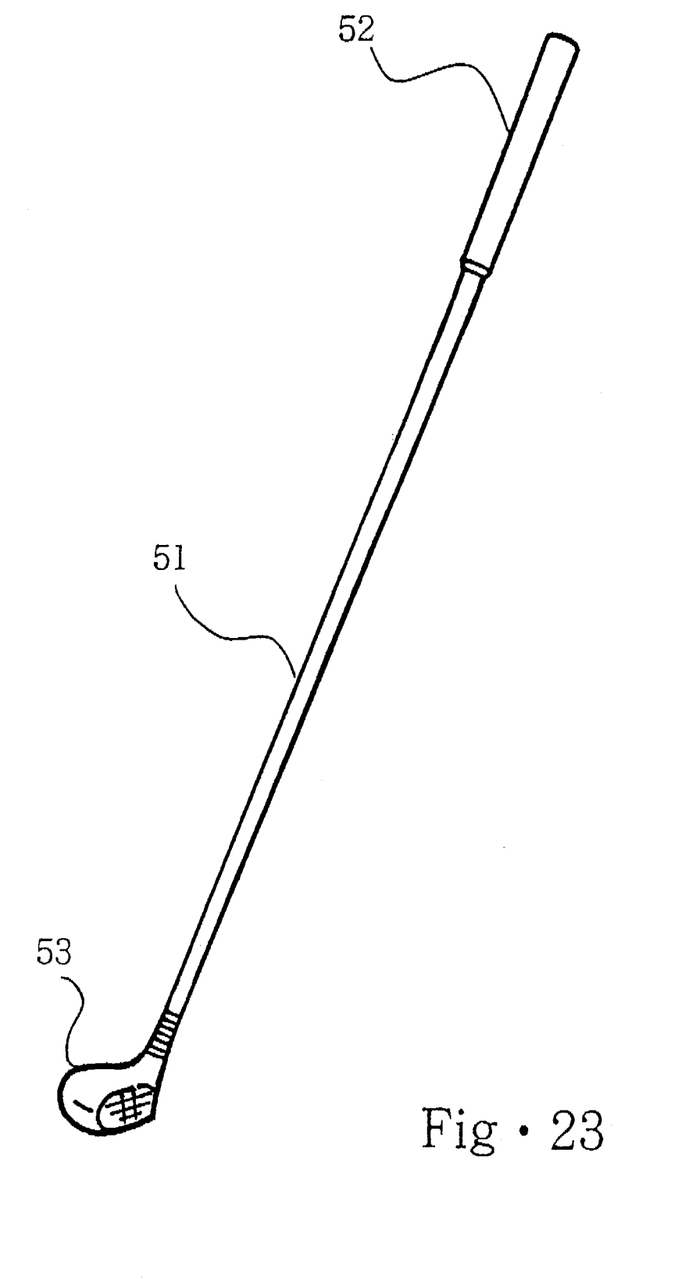
FIG. 23 is a perspective view showing a golf club according to the present invention.

The prepregs implementing the first to third embodiments are available for sleeve members of sporting goods such as tennis rackets and golf clubs. FIGS. 22 and 23 illustrate a tennis racket and a golf club each including a sleeve member of fiber reinforced thermoplastic resin according to the present invention.

The tennis racket is fabricated through a process as described hereinbelow. First, the prepreg implementing one of the first to third embodiment is prepared, and is shaped into an appropriate tubular configuration. The prepreg thus shaped is placed in a mold, and is heated over the melting point of the thermoplastic resin. Internal pressure is applied to the prepreg, and the prepreg is pressed against the inner surface of the mold. Thus, a frame 41 is formed from the prepreg. A grip 42 is provided to the frame 41, and strings 43 are stretched over the frame 41. Then, the tennis racket is completed.

The golf club is fabricated through a similar process. First, the prepreg implementing one of the first to third embodiment is prepared, and is shaped into an appropriate tubular configuration. The prepreg thus shaped is placed in a mold, and is heated over the melting point of the thermoplastic resin. Internal pressure is applied to the prepreg, and the prepreg is pressed against the inner surface of the mold. A shaft member 51 is formed from the prepreg. A grip 52 is provided to one end of the shaft member 51, and a head 53 is attached to the other end of the shaft member 51. Then, the golf club is completed.

Although particular embodiments of the present invention have been shown and described, it will be obvious to those skilled in the art that various changes and modifications may be made without departing from the spirit and scope of the present invention. For example, any kind of reinforcing fibers are available for the tows and the commingle yarns according to the present invention, and the thermoplastic resin is not limited to those described in the preferred embodiments.

The reinforcing fibers of each tow may be formed of different substances. For example, the reinforcing fibers may be formed of glass, and the other reinforcing fibers of the same tow may be formed of carbon. Any combination between glass, carbon, aramide and Kevler are available. Similarly, a tow contains reinforcing fibers of one substance, and another tow contains reinforcing fibers of another substance. A layer of a prepreg may contain reinforcing fibers of one substance, and another layer of the same prepreg may contain reinforcing fibers of another substance. The reinforcing fibers of the main commingle yarns may be different in substance from the reinforcing fibers of the auxiliary commingle yarns. The prepreg containing the different reinforcing fibers is called as a hybrid prepreg.

Finally, the prepreg according to the present invention may be shaped into a flexible board or another configuration.

What is claimed is:

1. A prepreg for a product of fiber reinforced thermoplastic resin, comprising:

a plurality of first thread means fusible under application of heat for forming a matrix of said fiber reinforced thermoplastic resin; and a plurality of second thread means providing reinforcing fibers of said fiber reinforced thermoplastic resin, each of said plurality of second thread means being a ribbon-shaped reinforcing fiber tow, said plurality of first thread means and said plurality of second thread means being woven into said prepreg, said ribbon-shaped reinforcing fiber tow being equal in thickness to or less than 0.5 millimeter, and the width of said ribbon-shaped reinforcing fiber tow being at least ten times larger than the thickness thereof.

2. The prepreg as set forth in claim 1, in which said plurality of second thread means are braided together with said plurality of first thread means so that each of said plurality of second thread means extends substantially in parallel to adjacent second thread means.

3. The prepreg as set forth in claim 1, in which the ratio of said thickness to said width ranges from 10 to 20.

4. The prepreg as set forth in claim 1, in which said plurality of first thread means are ribbon-shaped matrix fiber tows, each ribbon-shaped matrix fiber tow being equal in thickness to or less than 0.5 millimeter, and the width of each ribbon-shaped matrix fiber tow at least ten times larger than the thickness thereof.

5. The prepreg as set forth in claim 1, in which said plurality of first thread means includes a plurality of ribbon-shaped matrix fiber tows and a plurality standard matrix fiber tows with a generally circular cross section.

6. The prepreg as set forth in claim 1, in which said plurality of first thread means are matrix resin tapes.

7. The prepreg as set forth in claim 1, in which said plurality of first thread means are partially implemented by matrix fiber tows and partially implemented by reinforcing fiber tows.

8. The prepreg as set forth in claim 1, in which said plurality of second thread means are woven together with said plurality of first thread means into a cloth so that each of said second thread means extends substantially in parallel to adjacent second thread means.

9. The prepreg as set forth in claim 8, in which said cloth is shaped into a sleeve configuration.

* * * * *